United States Patent
Yoon et al.

(10) Patent No.: US 9,982,776 B2
(45) Date of Patent: May 29, 2018

(54) METHOD FOR PROTECTING CLUTCH FOR DUAL CLUTCH TRANSMISSION

(71) Applicants: Hyundai Motor Company, Seoul (KR); Kia Motors Corp., Seoul (KR)

(72) Inventors: Young Min Yoon, Suwon-si (KR); Jin Sung Kim, Suwon-si (KR); Hyung Hee Lee, Yongin-si (KR); Sung Hyun Cho, Yongin-si (KR); Ho Sung Kim, Anyang-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 632 days.

(21) Appl. No.: 14/619,995

(22) Filed: Feb. 11, 2015

(65) Prior Publication Data

US 2016/0084375 A1   Mar. 24, 2016

(30) Foreign Application Priority Data

Sep. 23, 2014   (KR) .................. 10-2014-0126633

(51) Int. Cl.
| | |
|---|---|
| *F16H 61/02* | (2006.01) |
| *F16H 61/688* | (2006.01) |
| *F16H 59/68* | (2006.01) |
| *F16H 59/72* | (2006.01) |

(52) U.S. Cl.
CPC ....... *F16H 61/0213* (2013.01); *F16H 61/688* (2013.01); *F16H 59/68* (2013.01); *F16H 2059/725* (2013.01); *F16H 2061/0241* (2013.01)

(58) Field of Classification Search
CPC ............... F16H 61/0213; F16H 61/688; F16H 2061/0241; F16H 2059/725; B60W 30/188; B60W 10/06; B60W 30/186
See application file for complete search history.

(56) References Cited

U.S. PATENT DOCUMENTS

| | | | | |
|---|---|---|---|---|
| 2007/0275819 A1* | 11/2007 | Hirata | ............... | B60K 6/365 477/5 |
| 2009/0082174 A1* | 3/2009 | Ikeda | ............... | F16H 59/72 477/98 |
| 2009/0082931 A1* | 3/2009 | Ikeda | ............... | F16H 59/72 701/51 |
| 2009/0082933 A1* | 3/2009 | Ikeda | ............... | F16H 59/72 701/62 |
| 2009/0143195 A1* | 6/2009 | Katakura | ............... | B60W 10/02 477/120 |

(Continued)

FOREIGN PATENT DOCUMENTS

| | | |
|---|---|---|
| JP | 9-42440 A | 2/1997 |
| JP | 2006-1338 A | 1/2006 |

(Continued)

*Primary Examiner* — David J Hlavka
(74) *Attorney, Agent, or Firm* — Morgan, Lewis & Bockius LLP

(57) ABSTRACT

A method for protecting a clutch for a Dual Clutch Transmission may include an input step of receiving an input of a temperature of a clutch, and a gear shift pattern changing step of changing a preset gear shift pattern and operating to perform gear shift in a vehicle speed region that secedes from a vehicle speed of the preset gear shift pattern when the temperature of the clutch is equal to or higher than a first reference temperature.

13 Claims, 3 Drawing Sheets

(56) References Cited

U.S. PATENT DOCUMENTS

| | | | | |
|---|---|---|---|---|
| 2011/0238276 A1* | 9/2011 | Tsujimura | ............... | F16D 48/08 |
| | | | | 701/68 |
| 2011/0288735 A1* | 11/2011 | Shelton | ................ | B60W 10/02 |
| | | | | 701/68 |
| 2014/0195087 A1* | 7/2014 | Ideshio | ................ | B60W 10/02 |
| | | | | 701/22 |
| 2014/0206502 A1* | 7/2014 | Dix | .................... | B60W 10/103 |
| | | | | 477/68 |
| 2015/0112561 A1* | 4/2015 | Satoyoshi | ........... | F16H 61/0213 |
| | | | | 701/65 |

FOREIGN PATENT DOCUMENTS

| | | |
|---|---|---|
| JP | 2006-46569 A | 2/2006 |
| JP | 4621969 B2 | 2/2011 |
| JP | 2011-196514 A | 10/2011 |
| JP | 4913848 B2 | 4/2012 |
| JP | 2013-035415 A | 2/2013 |
| JP | 2013-50130 A | 3/2013 |
| KR | 10-1103814 A | 1/2012 |
| KR | 10-2012-0062259 A | 6/2012 |
| KR | 10-2014-0060011 A | 5/2014 |

\* cited by examiner

METHOD FOR PROTECTING CLUTCH FOR DUAL CLUTCH TRANSMISSION

CROSS-REFERENCE(S) TO RELATED APPLICATIONS

The present application claims priority to Korean Patent Application No. 10-2014-0126633, filed Sep. 23, 2014 the entire contents of which is incorporated herein for all purposes by this reference.

BACKGROUND OF THE INVENTION

Field of the Invention

Various embodiments of the present invention relate to the technology to protect a clutch on high-temperature condition of the clutch; and particularly, to a method for protecting a clutch for a dual clutch transmission (DCT) which can protect the clutch without greatly deteriorating drivability of a vehicle when the temperature of the clutch is increased to exceed a specific temperature.

Description of Related Art

Recently, in order to cope with high oil prices and $CO_2$ environmental regulations, improvement of fuel efficiency of a vehicle is greatly required, and thus environmental vehicles, such as electric vehicles or hybrid vehicles, which can improve the fuel efficiency while reducing the discharge amount of exhaust gas have been continuously studied and developed.

Under such current situations, the most realistic countermeasures to improve the fuel efficiency of the vehicle are to improve the efficiency of an internal combustion engine or to heighten power transfer efficiency of a power train system.

On the other hand, a transmission having the most superior efficiency of a driving system is a manual transmission, and a DCT (Double Clutch Transmission) that is based on the manual transmission also has superior power transfer efficiency in comparison to an automatic transmission or a CVT (Continuously Variable Transmission).

The DCT is a system for automatically controlling a manual transmission, and unlike a general automatic transmission that uses a torque converter and a wet type multi-plate clutch, the DCT transfers an engine torque using a dry type clutch.

However, the dry type clutch has the drawbacks that it is difficult to cool the clutch when the clutch generates heat and thus the frictional performance of the clutch is considerably lowered to cause the power transfer not to be performed. In this case, clutch slip occurs continuously, and thus clutch fade out occurs to cause trouble of the clutch.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for protecting a clutch for a Dual Clutch Transmission (DCT) which can protect the clutch without greatly deteriorating drivability of a vehicle when the temperature of the clutch is increased to exceed a specific temperature.

According to various aspects of the present invention, a method for protecting a clutch for a Dual Clutch Transmission, may include an input step of receiving an input of a temperature of the clutch, and a gear shift pattern changing step of changing a preset gear shift pattern and operating to perform gear shift in a vehicle speed region that secedes from a vehicle speed of the preset gear shift pattern when the temperature of the clutch is equal to or higher than a first reference temperature.

In the gear shift pattern changing step, when the temperature of the clutch is equal to or higher than the first reference temperature and is lower than a second reference temperature, the preset gear shift pattern for upward gear shift is shifted to a higher-speed region of the vehicle speed.

In the gear shift pattern changing step, when the temperature of the clutch is equal to or higher than the first reference temperature and is lower than a second reference temperature, the preset gear shift pattern for downward gear shift is shifted to a lower-speed region of the vehicle speed.

In the gear shift pattern changing step, the gear shift pattern is changed so that a kick down gear shift that skips two or more gear shift stages is not performed.

The method may further include a slip rate reduction step of reducing a slip rate by making a clutch engagement speed during a vehicle operation higher than a reference speed when the temperature of the clutch is equal to or higher than a second reference temperature and is lower than a third reference temperature.

The method may further include a step of receiving inputs of temperatures of two clutches in the input step when the temperatures of the two clutches are equal to or higher than a third reference temperature, and a single clutch traveling step of controlling gear shift and traveling, when the temperature of one of the two clutches is equal to or higher than the third reference temperature, using only another clutch of the two clutches, wherein the third reference temperature is set to be higher than the first reference temperature.

The method may further include a clutch opening step of operating to prohibit a clutch operation through releasing the two clutches in all when the temperatures of the two clutches are equal to or higher than the third reference temperature, wherein in the clutch opening step, a clutch operation prohibition time is displayed to a driver.

In further another aspect of the present invention, the method may further include a step of receiving inputs of temperatures of two clutches in the input step when the temperatures of the two clutches are equal to or higher than the first reference temperature, and a single clutch traveling step of controlling gear shift and traveling, when the temperature of one of the two clutches is equal to or higher than a third reference temperature, using only another clutch of the two clutches, wherein the third reference temperature is set to be higher than the first reference temperature, and wherein the method may further include a clutch opening step of operating to prohibit a clutch operation through releasing the two clutches in all when the temperatures of the two clutches are equal to or higher than the third reference temperature.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A method for protecting a clutch for a DCT in accordance with the present invention briefly includes an input step (S10) and a gear shift pattern changing step (S20).

Figure 1:
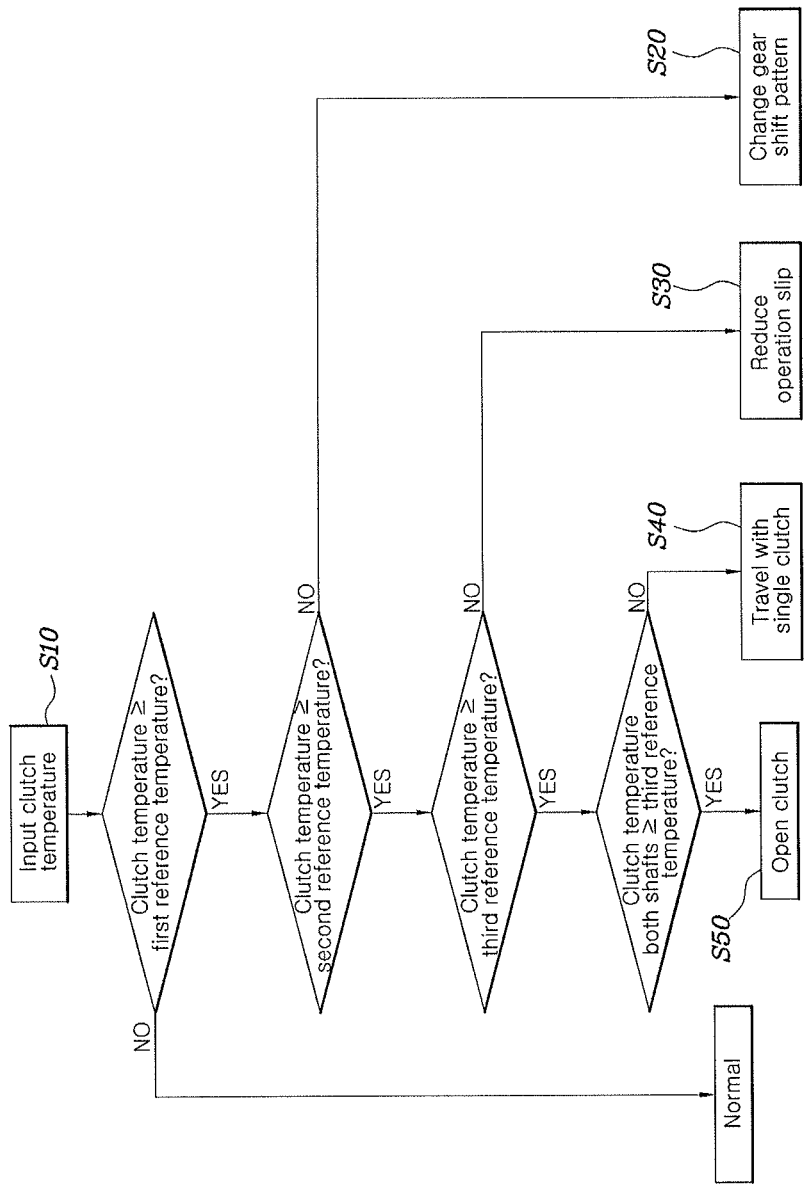
FIG. 1 is a diagram illustrating a clutch protection control flow by temperatures of a clutch in an exemplary method for protecting a clutch for a DCT according to an exemplary embodiment of the present invention.
Figure 2A:
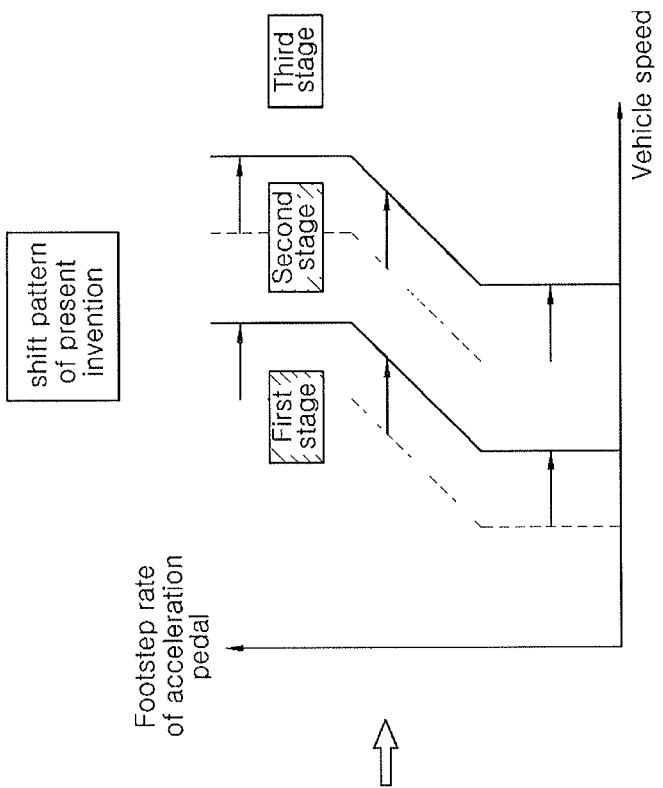
FIG. 2A and FIG. 2B are diagrams illustrating a control configuration for shifting a gear shift pattern according to an exemplary embodiment of the present invention.
Figure 2B:
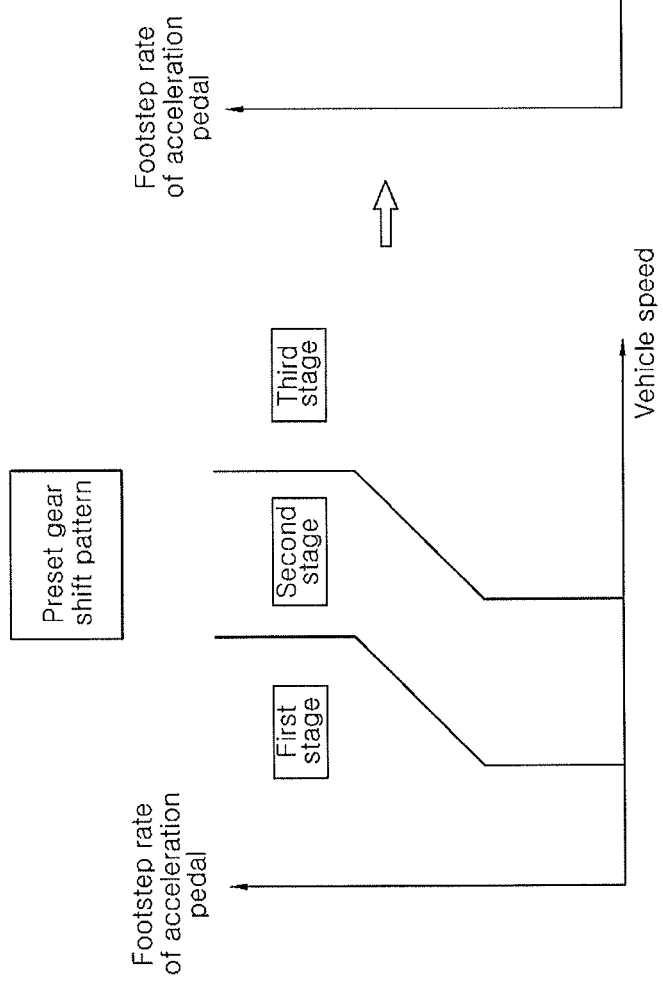

Referring to FIG. 1, first, in the input step (S10), an input of a temperature of a clutch is received.

For example, the temperature of the clutch may be input through modeling data according to engine operation conditions, or may be input through a known clutch temperature detection or calculation method.

In the gear shift pattern changing step (S20), if the temperature of the clutch is equal to or higher than a first reference temperature, a preset gear shift pattern is changed, and gear shift is performed in a vehicle speed region that secedes from a vehicle speed of the preset gear shift pattern.

That is, the gear shift pattern may be predetermined by gear shift stages as a relationship between a vehicle speed and a footstep rate of an acceleration pedal. If the temperature of the clutch is increased over a first reference temperature, the gear shift pattern is changed so that the position of the gear shift pattern is moved in a vehicle speed direction.

Accordingly, during traveling of a vehicle using the position-changed gear shift pattern, the vehicle is driven with higher engine output at the same vehicle speed in comparison to the existing gear shift pattern, and thus it becomes possible to escape from climbing situations at an earlier time. Accordingly, the heat amount of the clutch is reduced, and thus the clutch can be safely protected.

In particular, in accordance with the present invention, the gear shift patter can be changed to a lower-speed region or higher-speed region of vehicle speed.

For example, in the gear shift pattern changing step (S20) as shown in FIG. 1, if the temperature of the clutch is equal to or higher than the first reference temperature and is lower than a second reference temperature, the preset gear shift pattern for upward gear shift is shifted to a higher-speed region of vehicle speed.

Further, although not illustrated in the drawing, in the gear shift pattern changing step, if the temperature of the clutch is equal to or higher than the first reference temperature and is lower than the second reference temperature, the preset gear shift pattern for downward gear is shifted to a low-speed region of vehicle speed.

Here, although the second reference temperature is higher than the first reference temperature, and the first reference temperature and the second reference temperature are temperatures at which traveling using the clutch is still possible, the second reference temperature is the temperature at which it is required for a clutch protection logic to protect the clutch, and may have a temperature value that can be secured through several experiments of engine operation conditions and the like.

Further, the gear shift pattern for performing the shifting may be updated to a preset gear shift pattern, or may be separately set.

That is, according to the above-described configuration, since the position of the gear shift pattern is shifted in the vehicle speed direction under the high temperature condition of the clutch, the gear shift pattern is set so that the vehicle travels through gear shifting at higher engine speed in comparison to normal traveling. Accordingly, high engine output is derived to reduce the heat generation rate of the clutch, and a hysteresis section between the gear shift pattern for performing the upward gear shift and the gear shift pattern for performing the downward gear shift is further extended, so that frequent gear shifting is prevented, and the number of shifts is reduced to maximally reduce the use of the clutch.

Further, in accordance with the present invention, in the gear shift pattern changing step (S20), the gear shift pattern can be changed so that a kick down gear shift that skips two or more gear shift stages is not performed.

That is, in the case of a transmission that can perform 7-speed gear shift, the gear shift pattern is changed so as to prevent severe gear shift, such as a kick down gear shift from the seventh stage to the third stage or a kick down gear shift from the sixth stage to the second stage, and thus excessive torque change that is abruptly given to the clutch can be prevented to protect the clutch.

On the other hand, the method in accordance with the present invention may further include a slip rate reduction step (S30) of operating to reduce a slip rate of the clutch on condition that the temperature of the clutch is increased over the second reference temperature.

For example, the slip rate of the clutch is reduced by making a clutch engagement speed during a vehicle operation higher than a reference speed if the temperature of the clutch is equal to or higher than the second reference temperature and is lower than the third reference temperature.

Figure 3B:
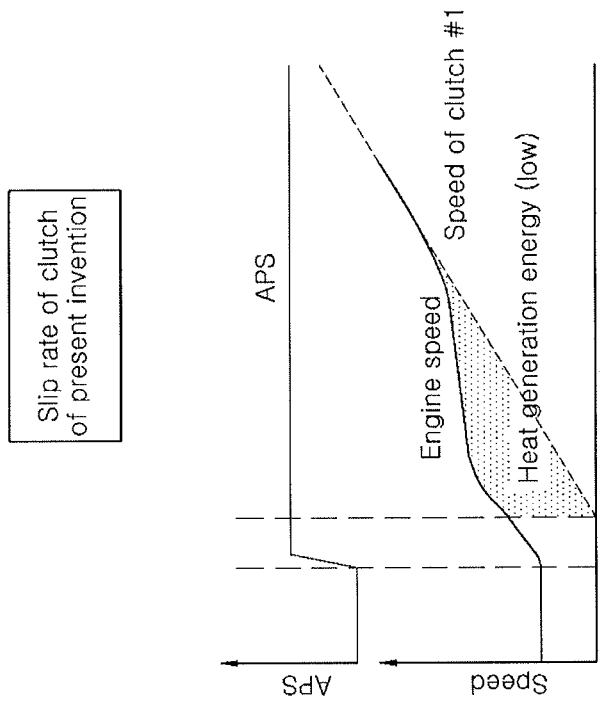
FIG. 3A and FIG. 3B are diagrams illustrating a control configuration for reducing a clutch slip rate during a vehicle operation according to an exemplary embodiment of the present invention.
Figure 3A:
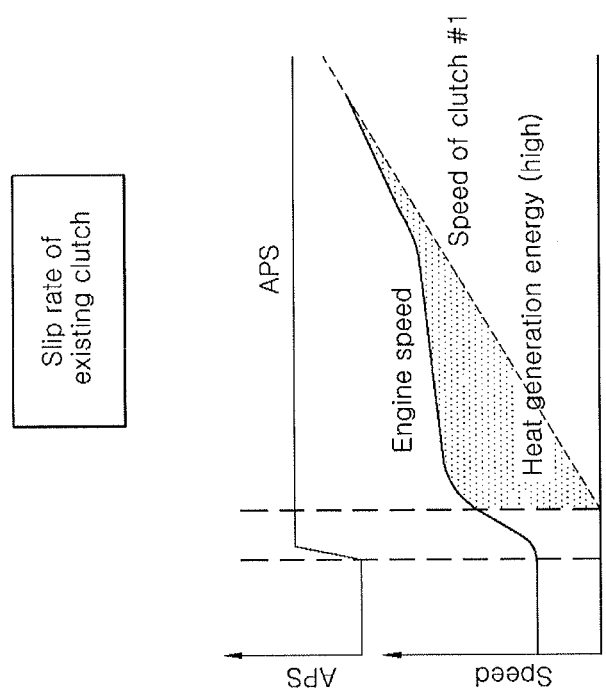

That is, the driving situation in which the clutch generates the largest amount of heat corresponds to a case where the slip of the clutch is generated when the vehicle operates (starts its operation). As shown in FIG. 3A and FIG. 3B, by rapidly controlling the clutch engagement speed during the vehicle operation, the slip rate of the clutch is reduced, and thus the heat generation rate of the clutch is reduced to safely protect the clutch at high temperature.

Here, the reference speed may be a speed that is set so that the clutch engagement is normally performed during the gear shifting in a normal traveling situation in which the temperature of the clutch is lower than the first reference temperature.

On the other hand, in the high temperature situation in which the temperature of the clutch is increased over the third reference temperature, whether to operate the clutch may be determined through determination of temperatures of two clutches.

For example, if the temperature of the clutch is equal to or higher than the third reference temperature, the temperatures of the two clutches are received as an input.

Here, the clutch may be a dual clutch that is used in the DCT. The respective temperatures of the clutches are individually input, and the input of the temperatures is made in the same manner as the temperature input method as described above. Further, the third reference temperature is higher than the second reference temperature, and may be a temperature at which active clutch protection, such as prohibition of the clutch operation, is required and which can be secured through several experiments of engine operation conditions and the like.

The method for protecting a clutch in accordance with the present invention may further include a single clutch traveling step (S40) of controlling gear shift and traveling using only the remaining clutch if the temperature of one of the two clutches is equal to or higher than the third reference temperature.

That is, if the temperature of one of the two clutches is continuously increased, the operation of the corresponding clutch, of which the temperature is excessively increased, is prohibited, and the vehicle traveling is performed using only the remaining clutch except for the clutch of which the operation is prohibited to appropriately protect the clutch.

In addition, the method for protecting a clutch in accordance with the present invention may further include a clutch opening step (S50) of operating to prohibit the clutch operation through releasing the two clutches in all if the temperatures of the two clutches are equal to or higher than the third reference temperature.

For example, in the clutch opening step (S50), a clutch operation prohibition time may be displayed to a driver through a cluster or the like.

That is, if the temperatures of the two clutches are all increased over the third reference temperature, the two clutches are controlled not to operate, and a clutch operation incapacity time is warned and displayed to the driver to guide the driver to stop the vehicle.

According to an exemplary embodiment of the present invention as described above, since the gear shift pattern is set so that the vehicle travels without gear shifting at high engine speed, high engine output is derived to reduce the heat generation rate of the clutch, and the hysteresis section between the gear shift pattern for performing the upward gear shift and the gear shift pattern for performing the downward gear shift is further extended. Accordingly, frequent gear shifting is prevented, and the number of shifts is reduced to maximally reduce the use of the clutch, so that the clutch can be safely protected at high temperature.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for protecting a clutch for a Dual Clutch Transmission, comprising: an input step of receiving an input of a temperature of the clutch; a gear shift pattern changing step of changing a preset gear shift pattern and operating to perform gear shift in a vehicle speed region that secedes from a vehicle speed of the preset gear shift pattern when the temperature of the clutch is equal to or higher than a first reference temperature; a step of receiving inputs of temperatures of two clutches in the input step when the temperatures of the two clutches are equal to or higher than a second reference temperature and a single clutch traveling step of controlling gear shift and traveling, when the temperature of one of the two clutches is equal to or higher than the second reference temperature, using only another clutch of the two clutches.

2. The method of claim 1, wherein in the gear shift pattern changing step, when the temperature of the clutch is equal to or higher than the first reference temperature and is lower than a third reference temperature, the preset gear shift pattern for upward gear shift is shifted to a higher-speed region of the vehicle speed.

3. The method of claim 1, wherein in the gear shift pattern changing step, when the temperature of the clutch is equal to or higher than the first reference temperature and is lower than a third reference temperature, the preset gear shift pattern for downward gear shift is shifted to a lower-speed region of the vehicle speed.

4. The method of claim 1, wherein in the gear shift pattern changing step, the gear shift pattern is changed so that a kick down gear shift that skips two or more gear shift stages is not performed.

5. The method of claim 1, further comprising:
a slip rate reduction step of reducing a slip rate by making a clutch engagement speed during a vehicle operation higher than a reference speed when the temperature of the clutch is equal to or higher than a third reference temperature and is lower than the second reference temperature.

6. The method of claim 1, wherein the second reference temperature is set to be higher than the first reference temperature.

7. The method of claim 1, further comprising:
a clutch opening step of operating to prohibit a clutch operation through releasing the two clutches in all when the temperatures of the two clutches are equal to or higher than the second reference temperature.

8. The method of claim 7, wherein in the clutch opening step, a clutch operation prohibition time is displayed to a driver.

9. A method for protecting a clutch for a Dual Clutch Transmission, comprising: an input step of receiving an input of a temperature of the clutch; a gear shift pattern changing step of changing a preset gear shift pattern and operating to perform gear shift in a vehicle speed region that secedes from a vehicle speed of the preset gear shift pattern when the temperature of the clutch is equal to or higher than a first reference temperature; a step of receiving inputs of temperatures of two clutches in the input step when the temperatures of the two clutches are equal to or higher than the first reference temperature; and a single clutch traveling step of controlling gear shift and traveling, when the temperature of one of the two clutches is equal to or higher than a second reference temperature, using only another clutch of the two clutches.

10. The method of claim 9, wherein the second reference temperature is set to be higher than the first reference temperature.

11. The method of claim 9, further comprising:
a clutch opening step of operating to prohibit a clutch operation through releasing the two clutches in all when the temperatures of the two clutches are equal to or higher than the second reference temperature.

12. The method of claim 11, wherein in the clutch opening step, a clutch operation prohibition time is displayed to a driver.

13. The method of claim 1, wherein the temperature of the clutch is input through modeling data according engine operation conditions.

* * * * *